(12) United States Patent
Bao et al.

(10) Patent No.: US 8,622,684 B2
(45) Date of Patent: Jan. 7, 2014

(54) WORKPIECE ORIENTATION APPARATUS

(75) Inventors: Yan-Cheng Bao, Shenzhen (CN); Zhen-Hua Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 316 days.

(21) Appl. No.: 13/090,274

(22) Filed: Apr. 20, 2011

(65) Prior Publication Data

US 2012/0051880 A1 Mar. 1, 2012

(30) Foreign Application Priority Data

Aug. 30, 2010 (CN) .......................... 2010 1 0266519

(51) Int. Cl.
*B23Q 1/48* (2006.01)
*B23Q 1/25* (2006.01)

(52) U.S. Cl.
USPC ........................... 414/781; 414/917; 74/89.27

(58) Field of Classification Search
USPC ............ 198/397.06, 411, 721, 726, 736, 747, 198/749; 254/126, 8 R; 269/55, 58, 60, 61, 269/62, 67, 73, 77, 82; 279/117, 119, 123; 294/119.1, 207; 414/621, 676, 749.3, 414/781, 783, 784, 917, 936; 74/490.1, 74/89.23, 89.27; 901/38, 39
See application file for complete search history.

(56) References Cited

U.S. PATENT DOCUMENTS

| 177,652 A | * | 5/1876 | Merchant ........................ 269/82 |
| 2,959,445 A | * | 11/1960 | Breslav ...................... 294/119.1 |
| 4,523,749 A | * | 6/1985 | Kindgren et al. ............... 269/32 |
| 4,544,193 A | * | 10/1985 | Dunn et al. .................. 294/86.4 |
| 5,082,413 A | * | 1/1992 | Grosz et al. .................. 414/24.5 |
| 5,271,706 A | * | 12/1993 | Helbach et al. ............... 414/676 |
| 5,529,359 A | * | 6/1996 | Borcea et al. ................. 294/207 |
| 5,588,796 A | * | 12/1996 | Ricco et al. ................... 414/741 |
| RE35,605 E | * | 9/1997 | Nomaru et al. ............ 294/119.1 |
| 8,240,637 B2 | * | 8/2012 | Hannewald .................... 251/229 |
| 2004/0051328 A1 | * | 3/2004 | Cinotti et al. .............. 294/119.1 |

* cited by examiner

*Primary Examiner* — Gregory Adams
(74) *Attorney, Agent, or Firm* — Altis Law Group, Inc.

(57) ABSTRACT

A workpiece orientation apparatus includes a base, two pushing bars, a linear actuator, a connecting member, at least one first connecting bar, and a second connecting bar. The two pushing bars are slidably connected to the base and aligned apart along a first direction. The linear actuator is mounted on the base. The connecting member is driven by the linear actuator to move back and forth along a second direction. One end of the first connecting bar is rotatably connected to the connecting member, and the other end of the first connecting bar is rotatably connected to one of the two pushing bars. One end of the second connecting bar is connected to the first connecting bar and is rotatably assembled together on the connecting member. The other end of the second connecting bar is rotatably connected to the other of the two pushing bars.

12 Claims, 3 Drawing Sheets

WORKPIECE ORIENTATION APPARATUS

BACKGROUND

1. Technical Field

This disclosure relates to orientation apparatuses, and particularly, to a workpiece orientation apparatus applied to an assembly line.

2. Description of Related Art

Presently, belt-conveyor assembly lines are widely used in automated assembly manufacturing processes. Workpieces are placed on the conveyor belt of the assembly line and sent to assembly stations. At some of the assembly stations, the workpieces may need to be manually arranged in a predetermined orientation, which results in a waste of manpower that is costly.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the workpiece orientation apparatus. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
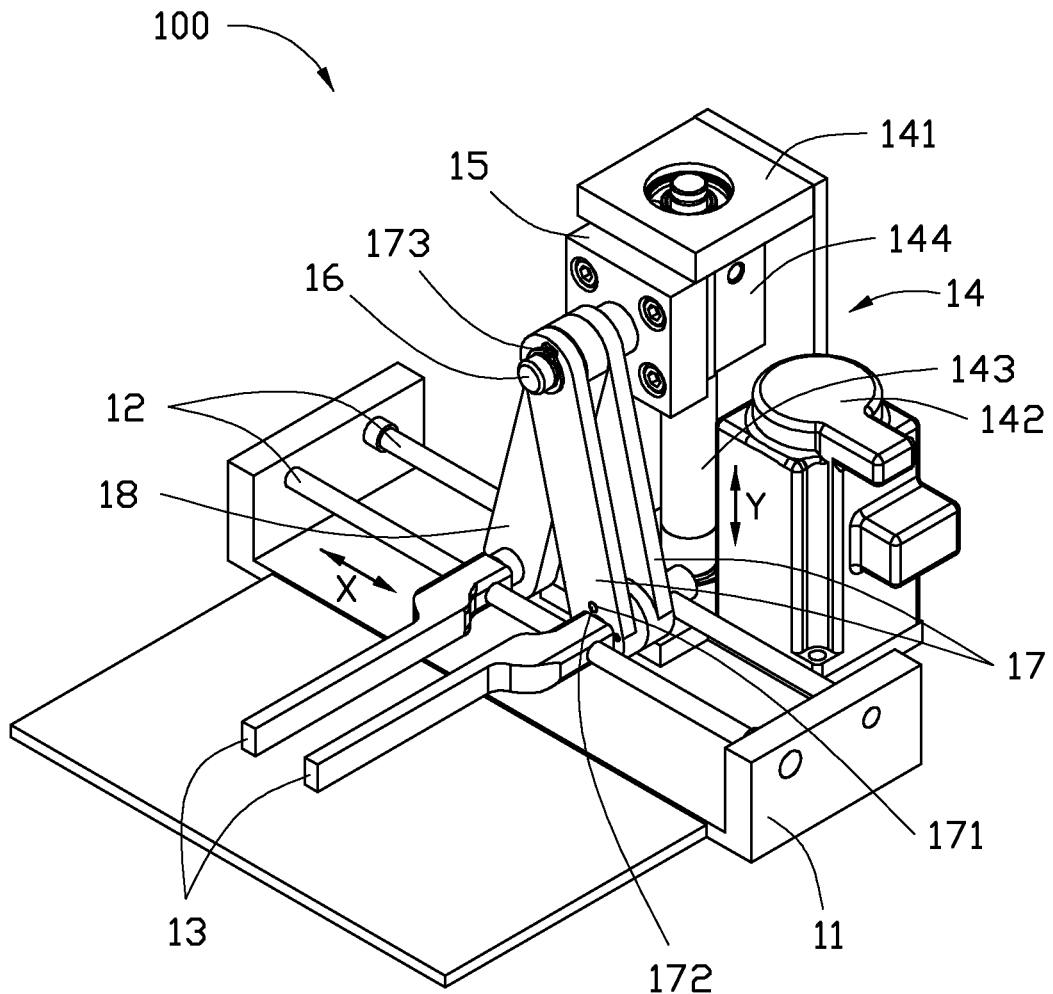
FIG. 1 shows an assembled isometric view of an embodiment of a workpiece orientation apparatus.
Figure 2:
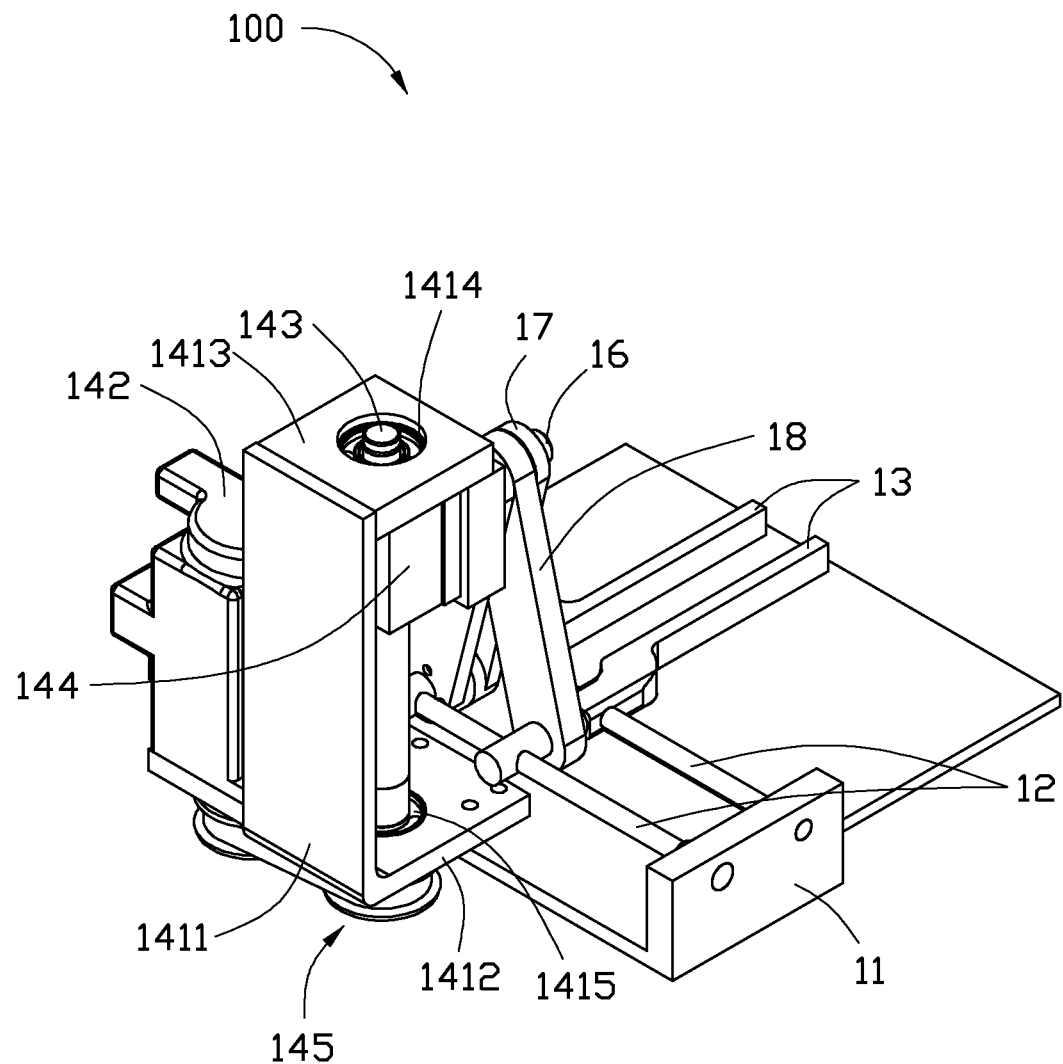
FIG. 2 is similar to FIG. 1, but viewed from another aspect.
Figure 3:
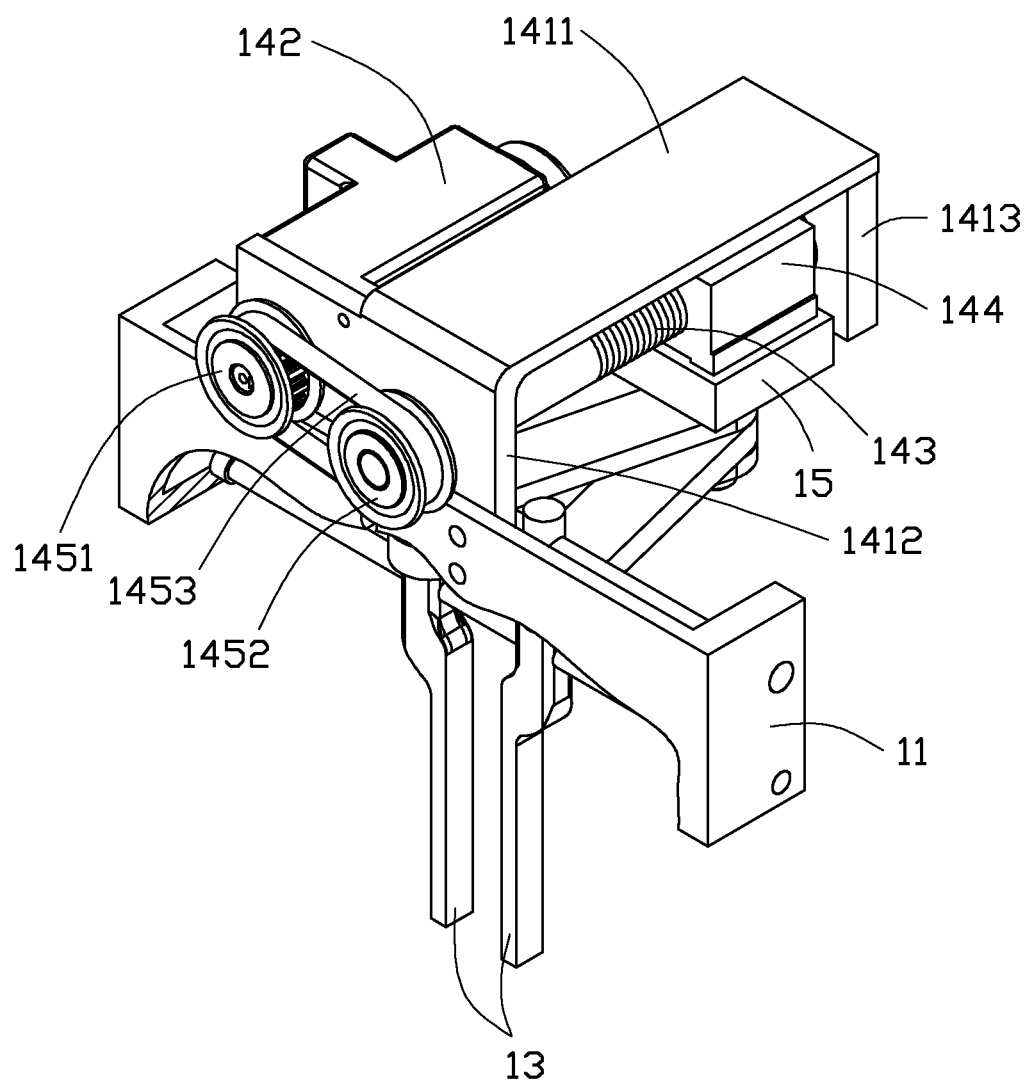
FIG. 3 shows a partial sectional view of the workpiece orientation apparatus of FIG. 1, but viewed from another aspect.

Referring to FIGS. 1 through 3, an embodiment of a workpiece orientation apparatus 100 includes a base 11, at least one guiding bar 12 assembled to the base 11, two spaced pushing bars 13, a linear actuator 14, a connecting member 15, a rotary shaft 16, two first connecting bars 17, and a second connecting bar 18. The base 11 is a substantially a U-shaped board. In the illustrated embodiment, there are two spaced guiding bars 12, which are mounted in perpendicular to sidewalls (not labeled) of the base 11 along a first direction X.

The two pushing bars 13 are disposed perpendicular to the guiding bar 12. The two pushing bars 13 are slidably connected to the two guiding bars 12, arranged along the first direction X, and are configured for orientating every two workpieces (not shown) sent along an assembly line (not shown).

The linear actuator 14 is mounted on the base 11 and positioned adjacent to the guiding bar 12. The linear actuator 14 is configured for providing a linear driving force along a second direction Y perpendicular to a base of the base 11 and the first direction X. The linear actuator 14 includes a support seat 141 fixed to the base 11, a motor 142, a screw rod 143, and a nut 144. The support seat 141 is substantially U-shaped, and includes a side plate 1411, a bottom plate 1412 perpendicularly connected to one bottom end of the side plate 1411, and a top plate 1413 perpendicularly connected to the opposite other top end of the side plate 1411. The bottom plate 1412 is fixed to the base 11 and defines a first mounting hole 1415. A second mounting hole 1414 is defined through the top plate 1413 opposite to and coaxial with the first mounting hole 1415. The motor 142 is mounted on the support seat 141 and configured for driving the screw rod 143 to rotate. The screw rod 143 is mounted to the support seat 141 and is connected to the motor 142. Two ends of the screw rod 143 are rotatably assembled into and received within the first and second mounting holes 1415, 1414, respectively. The nut 144 is screwed onto the screw rod 143.

The connecting member 15 is fixed to the nut 144 of the linear actuator 14, and is driven by the linear actuator 14 to move back and forth along the second direction Y relative to the base 11 and the support seat 141. When the screw rod 143 is driven by the motor 142 to rotate, then, the nut 144 rotates relative to the screw rod 143 and moves along an axial direction of the screw rod 143 (namely the second direction Y), thereby driving the connecting member 15 to move along the second direction Y to a preset position.

The rotary shaft 16 is mounted to the connecting member 15 along a direction perpendicular to the screw rod 143, and is positioned above the base 11 along a direction perpendicular to the guiding bar 12.

The two first connecting bars 17 have the same length as the second connecting bar 18. The second connecting bar 18 is positioned between the two first connecting bars 17. Each first connecting bar 17 defines a connecting hole 171 for connecting the two first connecting bars 17 together by a hinge pin 172. One end of each first connecting bar 17 is aligned with and connected to one end of the second connecting bar 18 and are rotatably assembled together on the rotary shaft 16. The other ends of the two first connecting bars 17 are rotatably connected to one of the pushing bars 13 and the other end of the second connecting bar 18 is rotatably connected to the other pushing bar 13 and are all positioned between the two guiding bars 12. Thus, the first connecting bars 17 and the second connecting bar 18 are symmetrically positioned relative to the second direction Y. As the rotary shaft 16 together with the connecting member 15 is driven by the linear actuator 14 to move in either direction along the second direction Y, then, the first connecting bars 17 and the second connecting bar 18 are driven to rotate relative to the rotary shaft 16, which in turn causes the two pushing bars 13 to move or slide along relative to the guiding bar 12 along the first direction X.

In another embodiment, the workpiece orientation apparatus 100 may further include an extra belt conveyor mechanism 145 disposed between the motor 142 and the screw rod 143 for providing a driving force or changing the speed of the motor 142. The belt conveyor mechanism 145 includes a driving wheel 1451 assembled to one output shaft (not labeled) of the motor 142, a driven wheel 1452 fixed to the screw rod 143, and a conveyor belt 1453 assembled to the driving wheel 1451 and the driven wheel 1452. The conveyor belt 1453 can be a timing belt, or a flat belt etc. Preferably, the belt conveyor mechanism 145 is mounted to the bottom plate 1412 and positioned at a side away from the top plate 1413, and the motor 142 is mounted adjacent to the side at the top plate 1413.

It is to be understood that the linear actuator 14 can also be a gear-rack structure.

It is to be understood that the number of the first connecting bar 17 can be one.

It is to be understood that an extra latching ring 173 could be applied and detachably assembled to a distal end of the rotary shaft 16 for preventing the first connecting bar 17 and the second connecting bar 18 from departing from the rotary shaft 16 during usage. Specifically, the latching ring 173 is substantially C-shaped, a latching groove (not labeled) is predefined in the rotary shaft 16 corresponding to the latching ring 173, such that the latching ring 173 is detachably latched into the latching groove of the rotary shaft 16. It is to be noted that, the latching ring 173 could be also a screw nut.

During use of the workpiece orientation apparatus 100, the workpiece orientation apparatus 100 is applied to an assembly line for orientating workpieces sent by the assembly line. The every two workpieces are sent by the assembly line to move toward the base 11 and the two pushing bars 13. When the connecting member 15 is driven by the linear actuator 14 to move downwardly along the second direction Y, then, the first and second connecting bars 17, 18 are rotated relative to the rotary shaft 16 for being opened outwardly, with an angle between the first and second connecting bars 17, 18 to be increasing; meanwhile, the two pushing bars 13 are driven to slide along the guiding bar 12 away from each other, thereby separating the every two workpieces apart by the two pushing bars 13. When the connecting member 15 is driven by the linear actuator 14 to move upwardly along the second direction Y, then, the first and second connecting bars 17, 18 are folded toward each other; meanwhile, the two pushing bars 13 are driven to slide along the guiding bar 12 toward each other, thereby fulfilling the combination to the every two workpieces sent by the assembly line. It is easy to control and operate the workpiece orientation apparatus 100.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A workpiece orientation apparatus, comprising:
   a base;
   two guiding bars parallelly mounted to the base along a first direction;
   two pushing bars slidably connected to the guiding bars and aligned apart along the first direction;
   a linear actuator mounted on the base and positioned adjacent to the guiding bars, and comprising a support seat fixed to the base and a motor, the motor being mounted on the support seat;
   a connecting member driven by the motor of the linear actuator to move back and forth along a second direction;
   one or more first connecting bars, one end of the first connecting bar rotatably connected to the connecting member, the other end of the first connecting bar rotatably connected to one of the two pushing bars; and
   a second connecting bar, one end of the second connecting bar connected to the first connecting bar and rotatably assembled together on the connecting member, the other end of the second connecting bar rotatably connected to the other of the two pushing bars,
   wherein the two pushing bars are driven to slide along the first direction by the linear actuator and the first and second connecting bars.

2. The workpiece orientation apparatus as claimed in claim 1, wherein the linear actuator further comprises a screw rod and a nut, the screw rod is mounted to the support seat and is connected with the motor; the nut is rotatably screwed on the screw rod, the connecting member is fixed to the nut of the linear actuator, and is driven by the linear actuator to move up and down along the second direction relative to the base and the support seat.

3. The workpiece orientation apparatus as claimed in claim 2, wherein the support seat includes a side plate, a bottom plate connected to one bottom end of the side plate, and a top plate connected to the opposite other top end of the side plate; the bottom plate is fixed with the base and defines a first mounting hole, a second mounting hole is defined through the top plate opposite to and coaxially with the first mounting hole; two ends of the screw rod are rotatably assembled into and received within the first and second mounting holes, respectively.

4. The workpiece orientation apparatus as claimed in claim 2, wherein the workpiece orientation apparatus further comprises an extra belt conveyor mechanism configured and disposed between the motor and the screw rod for providing a driving force or changing the speed of the motor.

5. The workpiece orientation apparatus as claimed in claim 4, wherein the belt conveyor mechanism comprises a driving wheel assembled to the motor, a driven wheel fixed to the screw rod, and a conveyor belt assembled to the driving wheel and the driven wheel.

6. The workpiece orientation apparatus as claimed in claim 1, wherein the linear actuator is a gear-rack structure.

7. A workpiece orientation apparatus, comprising:
   a base;
   two spaced guiding bars parallelly mounted to the base along a first direction;
   two pushing bars slidably connected to the two guiding bars;
   a linear actuator mounted on the base, comprising a support seat fixed to the base and a motor, the motor being mounted on the support seat and connected with the rotary shaft for providing a driving force to the connecting member;
   a connecting member connected to the motor, and driven by the motor of the linear actuator to move along a second direction perpendicular to the first direction;
   a rotary shaft mounted to the connecting member along a direction perpendicular to the guiding bars, and positioned above the base;
   one or more first connecting bars, one end of the first connecting bar rotatably connected to the connecting member, the other end of the first connecting bar rotatably connected to one of the two pushing bars; and
   a second connecting bar, one end of the second connecting bar connected to the first connecting bar and rotatably assembled together on the connecting member, the other end of the second connecting bar rotatably connected to the other of the two pushing bars, the first and the second connecting bars intersecting with each other and each of the first and the second connecting bars being rotatably hinged to the rotary shaft.

8. The workpiece orientation apparatus as claimed in claim 7, wherein the linear actuator further comprises a screw rod and a nut, the screw rod is mounted to the support seat and is connected with the motor; the nut is rotatably screwed on the screw rod, the connecting member is fixed to the nut of the linear actuator, and is driven by the linear actuator to move up and down along the second direction relative to the base and the support seat.

9. The workpiece orientation apparatus as claimed in claim 8, wherein the support seat includes a side plate, a bottom plate connected to one bottom end of the side plate, and a top plate connected to the opposite other top end of the side plate; the bottom plate is fixed with the base and defines a first mounting hole, a second mounting hole is defined through the top plate opposite to and coaxially with the first mounting hole; two ends of the screw rod are rotatably assembled into and received within the first and second mounting holes, respectively.

10. The workpiece orientation apparatus as claimed in claim 8, wherein the workpiece orientation apparatus further comprises an extra belt conveyor mechanism configured and disposed between the motor and the screw rod for providing a driving force or changing the speed of the motor.

11. The workpiece orientation apparatus as claimed in claim 10, wherein the belt conveyor mechanism comprises a driving wheel assembled to the motor, a driven wheel fixed to the screw rod, and a conveyor belt assembled to the driving wheel and the driven wheel.

12. The workpiece orientation apparatus as claimed in claim 7, wherein the linear actuator is a gear-rack structure.

* * * * *